United States Patent [19]

Hope et al.

[11] 3,969,942
[45] July 20, 1976

[54] LIQUID LEVEL RESPONSIVE APPARATUS

[76] Inventors: Henry F. Hope, 3192 Huntingdon Road, Huntingdon Valley, Pa. 19006; Stephen F. Hope, 2548 Wyandotte Road, Willow Grove, Pa. 19090

[22] Filed: Aug. 11, 1975

[21] Appl. No.: 603,779

[52] U.S. Cl. .................................................. 73/302
[51] Int. Cl.² .......................................... G01F 23/16
[58] Field of Search ..................... 73/302, 290 R, 37

[56] References Cited
UNITED STATES PATENTS

| | | | |
|---|---|---|---|
| 2,581,427 | 1/1952 | Matthews | 73/302 |
| 2,658,389 | 11/1953 | Eby | 73/302 |
| 3,200,971 | 8/1965 | Trethewey | 73/302 X |
| 3,467,122 | 9/1969 | Jones | 73/290 R UX |
| 3,494,191 | 2/1970 | Cawley et al. | 73/290 R |
| 3,620,085 | 11/1971 | Khoi | 73/302 X |
| 3,734,313 | 5/1973 | Gauthier et al. | 73/290 R X |
| 3,780,581 | 12/1973 | Acre et al. | 73/302 |
| 3,885,435 | 5/1975 | Cascio | 73/290 R |

*Primary Examiner*—Richard C. Queisser
*Assistant Examiner*—Joseph W. Roskos
*Attorney, Agent, or Firm*—Z. T. Wobensmith, 2nd; Z. T. Wobensmit, III

[57] ABSTRACT

Liquid level responsive apparatus is provided which includes a tube having a lower terminal end immersed in the liquid in a container uncovered when the liquid level is below the terminal end for discharge of air from the tube, the tube having a small electric motor driven air pump supplying air thereto, the tube having a pressure tap connected to one side of a diaphragm for normally maintaining the diaphragm in one control position, the diaphragm being collapsible to another control position, the tube having a vent of predetermined size for limited venting of air from the tube while the diaphragm is maintained in its one control position. The diaphragm can control a microswitch which in turn can control any desired operation such as shut-off of delivery. A plurality of tubes can be connected in parallel with their terminal ends in different liquid containers.

8 Claims, 3 Drawing Figures

LIQUID LEVEL RESPONSIVE APPARATUS

BACKGROUND OF THE INVENTION

1. Field of the Invention

This invention relates to liquid level responsive apparatus and more particularly to such apparatus which detects a departure of the level of liquid in one or more containers from a predetermined level.

2. Description of the Prior Art

Various devices have heretofore been proposed employing a gas delivery tube for sensing a liquid level.

Cawley, et al., in U.S. Pat. No. 3,494,191, show a fluid driven surface level sensing system in which a level sensing element discharges a jet against the surface of liquid in a vessel. Many pneumatic dimension gaging devices operate in a similar manner to vary a back pressure or signal pressure in accordance with the spacing between a nozzle and a work piece in the path of the nozzle. The Cawley, et al. structure cannot be used with a plurality of containers.

Gauthier, et al., in U.S. Pat. No. 3,734,313, show a bulk bin level indicator in which a pneumatically operated sensor having a J-shaped output tube supplies air to an input tube which may be obstructed by bulk material present at that level, a pressure change at the input tube occurring when there is no material present and providing a signal at a pressure operated switch. The Gauthier, et al. structure cannot be used with a plurality of containers.

Cascio, in U.S. Pat. No. 3,885,435 shows a method and device for detecting presence or absence of a fluid in a receptacle, in which a detecting device is employed having an expansible chamber for receiving the fluid and disposed within a passageway. An air supply is connected through a pressure regulator to the passageway which is also connected to a fluidic switch, access of air to the switch being determined by the condition of the expansible chamber. In this construction, unlike those previously mentioned, the air is kept out of contact with the liquid the level of which is to be sensed so that there is no contamination or chemical combination of the air with the liquid. The Cascio structure cannot be used with a plurality of containers.

Kalle, in U.S. Pat. No. 3,137,137 shows a regulator in which a bubble tube extends downwardly into a liquid container, the tube being supplied with pressure gas from a source through a restriction. A branch conduit extends from the bubble tube to an impulse transmitting mechanism which includes a flexible diaphragm to provide a signal for control purposes. The use of a bubble tube subjects the liquid to possibility of contamination or oxidation which is objectionable with many chemical solutions whose level is to be sensed. The Kalle structure cannot be used with a plurality of containers.

SUMMARY OF THE INVENTION

In accordance with the invention liquid level sensing apparatus is provided which is particularly suited for sensing of levels of liquids which are capable of contamination or chemical change if air is passed therethrough, the apparatus utilizing a tube with one or more branches each having a lower terminal end normally immersed in the liquids in one or a plurality of containers, the levels of which are to be sensed and which terminal ends are uncovered when the level of the liquid is below such terminal end, the tube having a small electric motor driven air pump supplying air thereto, the tube having a pressure tap connected to one side of a diaphragm for normally maintaining the diaphragm in one control position, release of air through a terminal end effecting collapsing movement of the diaphragm to another control position, the tube having spaced from the liquids a vent of predetermined size for limited venting of air from the tube while the diaphragm is maintained in its one control position, a microswitch or other device requiring only a small force being controlled by the diaphragm, the microswitch in turn controlling any desired devices for indication or control.

It is the principal object of the invention to provide liquid level sensing and control apparatus which is simple in construction, reliable in operation and which can be constructed at very low cost as compared with liquid level sensing apparatus heretofore available.

It is a further object of the invention to provide liquid level sensing and control apparatus which has a wide range of usefulness including the preparation of chemical solutions in which a plurality of solutions are brought together in selected proportions, the exhaustion of one component requiring replenishing to maintain the desired proportioning.

It is a further object of the invention to provide liquid level sensing and control apparatus in which the departure from predetermined liquid levels in any one of a plurality of vessels can be utilized to provide a control function.

It is a further object of the invention to provide liquid level sensing and control apparatus in which the forces utilized are of small magnitude so that the apparatus is light in weight and easily mounted at the place of use.

It is a further object of the invention to provide liquid level sensing apparatus in which a sensing tube is utilized and which tube only requires a small space or neck opening in the container in which it is placed.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which.

Figure 1:
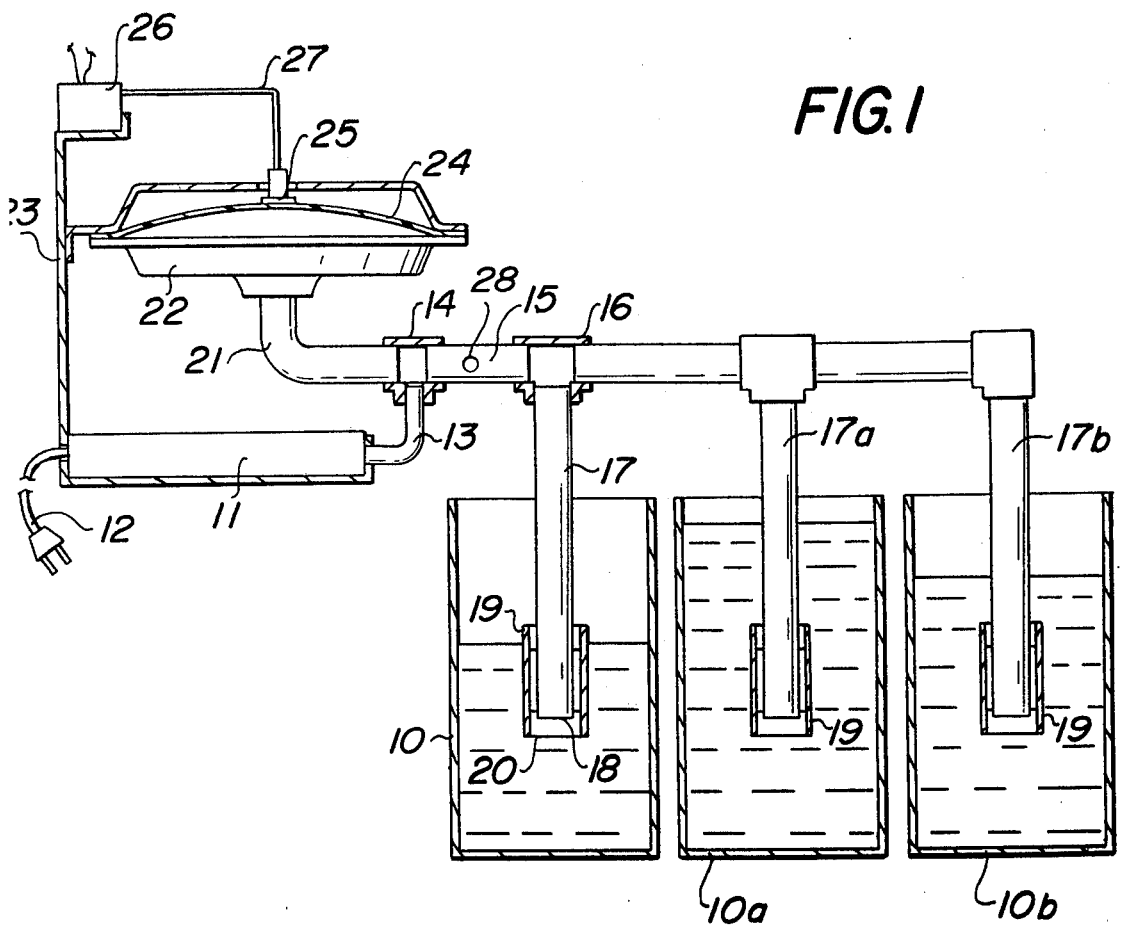
FIG. 1 is a diagrammatic view of liquid level responsive apparatus in accordance with the invention.
Figure 2:
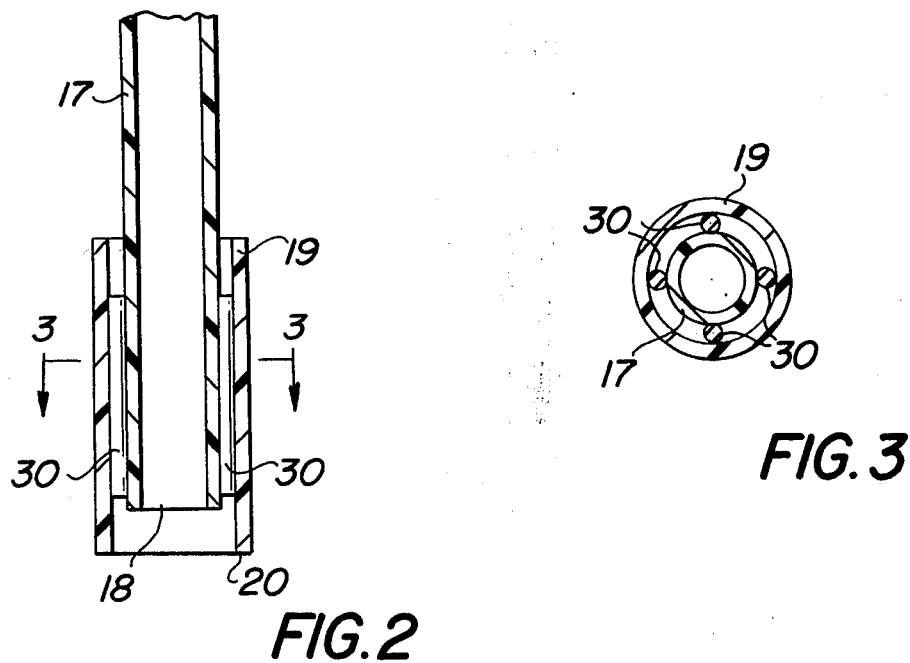
FIG. 2 is an enlarged fragmentary vertical sectional view of the lower end of the probe tube with the air escape or shield tube mounted thereon.
Figure 3:
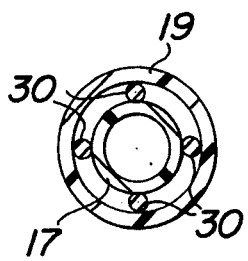
FIG 3 is a transverse sectional view taken approximately on the line 3—3 of FIG. 2.

It should, of course, be understood that the description and drawings herein are illustrative merely and that various modifications and changes can be made in the structure disclosed without departing from the spirit of the invention.

DESCRIPTION OF A PREFERRED EMBODIMENT

Referring now more particularly to the drawings the liquid level sensing and control apparatus of the invention is shown for sensing liquid levels in a plurality of vessels or containers 10, 10a, 10b.

The vessels or containers 10, 10a, 10b are adapted to contain a plurality of chemical solutions which are to be brought together in desired proportions for use by proportioning apparatus now available and which in itself forms no part of the invention. Such proportioning apparatus can be electric motor driven with provision for shutting off the motor or can have valves to be shut off if desired, so that the proper proportioning will be maintained.

An electric motor driven air pump 11 is provided and advantageously is the type of pump employed for supplying air to a small hobby type aquarium for aeration of the water in the aquarium. The pump 11 can have input leads 12 for connection to a source of 115 volt 60 Hz alternating current so that no special electrical source is required.

The pump 11 has an air delivery pipe 13 connected to a T-fitting 14 from which a tube 15 extends to a fitting 16. The fitting 16 has a sensing or probe pipe 17 extending therefrom with its lower terminal end 18 extending downwardly in spaced relation to the bottom of the vessel 10. The terminal end 18 has secured thereto in spaced surrounding relation thereto an air escape or shield tube 19, with interposed spacers 30. The lower end 20 of tube 19 can be spaced as desired with respect to the bottom of the vessel 10. The upper end of the shield tube 19 is disposed above the terminal end 18 for guiding air upwardly with minimal contact of the air with the liquid in the vessel 10.

The fitting 14 has a fluid connection 21 extending therefrom to a diaphragm chamber 22 in a mounting frame 23. The diaphragm chamber 22 is bounded by a large highly relatively flexible diaphragm 24, of rubber, neoprene, or other desired material, for easy pressure lift. The diaphragm 24 has a disc 25 secured to its upper face. In a specific embodiment the diaphragm 24 can have a diameter of the order of four inches.

A microswitch 26 or other desired device responsive to the positioning of the diaphragm 24 can be carried by the frame 23 with an operating arm 27 engaging the disc 25 for providing a signal for indication visual or audible, or for control, such as of a pump motor or fluid control valves.

In the fluid line between the pump 11 and the pipe 17, but outside the container 10, and preferably in the pipe 17, a vent 28 is provided, preferably in the form of an orifice, and which in a specific embodiment can have a diameter of the order of 0.093 inches. The sizing of the vent 28 is determined by the output of the pump 11 so that sufficient pressure is available from the pump 11 to normally hold the diaphragm 24 in its upper or lifted position. The vent 28 serves to discharge the air at the rate at which it is supplied from the pump 11 so that air is not discharged through the terminal end 18 of sensing tube 17.

The sensing apparatus has been described for a single vessel 10 but may be employed with a plurality of additional vessels, two being shown at 10a, 10b, the fitting 16 having probe pipes 17a, 17b extending in parallel therefrom into the additional vessels 10a, 10b each with a shield tube 19.

The mode of operation will now be explained.

Assume that the vessels 10, 10a, 10b each has liquid therein and that the pipes 17, 17a, 17b are inserted therein with the shield tubes 19 spaced from the bottom.

Air is supplied by the air pump 11 to and through the air delivery pipe 13, and the tube 15 and to the pipes 17. Air is continuously discharged through the vent 28 to the atmosphere. The pressure of the air delivered through the fluid connection 21 to the diaphragm chamber 22 is sufficient to maintain the diaphragm 24 in an inflated condition to position the operating arm 27 at one of its predetermined positions.

If now, the liquid level in one of the vessels 10, 10a, 10b falls below the terminal end 18 of one of the probe pipes 17, 17a, 17b, air is discharged from the system including the diaphragm chamber 22 so that the diaphragm 24 drops and permits the operating arm 27 to move to its other predetermined position for change of condition of the microswitch 26. The change of condition may be utilized in any desired manner such as to cut off delivery from the vessels 10, 10a, 10b.

It will be noted that the air escape or shield tube 19 directs upwardly any air escaping from the tube 17, 17a, 17b and essentially out of contact with the remaining liquid in the vessel 10, 10a, 10b, so that oxidation of the liquid is avoided as well as any other contaminating action.

We claim:

1. Liquid level responsive apparatus comprising
a source of gas under pressure,
a probe tube connected to said source and immersed in the liquid whose level is to be measured and having a lower terminal end exposed upon fall of the liquid level therebelow,
a pressure responsive member connected to said probe tube and having a normal position responsive to said gas under pressure,
said tube having vent means for normal discharge of gas from said source,
said probe tube upon exposure of said terminal end discharging the gas in said tube whereby pressure responsive member is movable to a different position, and
a control member responsive to the positioning of said pressure responsive member.

2. Liquid level responsive apparatus as defined in claim 1 in which
said pressure responsive member is a diaphragm.

3. Liquid level responsive apparatus as defined in claim 1 in which
said control member is a microswitch.

4. Liquid level responsive apparatus as defined in claim 1 in which
said source of gas under pressure is an air pump.

5. Liquid level responsive apparatus as defined in claim 1 in which
said vent means is a fixed orifice.

6. Liquid level responsive apparatus as defined in claim 1 in which
said probe tube in surrounding and spaced relation thereto is provided with a shield tube for guiding escaping gas from said probe tube out of contact with the liquid whose level is to be measured.

7. Liquid level responsive apparatus as defined in claim 6 in which
said shield tube has its lower end disposed below the terminal end of the probe tube.

8. Liquid level responsive apparatus as defined in claim 1 in which
a plurality of probe tubes are provided each connected to said probe tube each for immersion in the liquid in a different vessel.

* * * * *